United States Patent [19]

Dudek et al.

[11] 4,383,324

[45] May 10, 1983

[54] DIGITAL DATA TRANSMISSION SYSTEMS

[75] Inventors: Michael T. Dudek; John M. Robinson, both of Middlesex, England

[73] Assignee: The General Electric Company Limited, London, England

[21] Appl. No.: 204,289

[22] Filed: Nov. 5, 1980

[30] Foreign Application Priority Data

Nov. 16, 1979 [GB] United Kingdom ................. 7939800
Dec. 5, 1979 [GB] United Kingdom ................. 7942008

[51] Int. Cl.³ ............................................ H03D 3/20
[52] U.S. Cl. ...................................... 375/76; 375/81; 329/50; 329/112
[58] Field of Search ..................... 375/15, 39, 54, 81, 375/101, 34, 99, 76; 370/6, 20; 455/60; 328/162–165, 172, 181; 329/50, 112, 124; 307/360–362; 331/12

[56] References Cited

U.S. PATENT DOCUMENTS

| 3,378,711 | 4/1968 | Van Gerwen | 455/60 |
| 3,518,680 | 6/1970 | McAuliffe | 370/6 |
| 3,600,700 | 8/1971 | Matsuo | 331/12 |
| 3,669,511 | 9/1972 | Motley | 375/15 |
| 4,032,847 | 6/1977 | Unkauf | 375/101 |
| 4,085,378 | 4/1978 | Ryan et al. | 329/124 |
| 4,255,713 | 3/1981 | Yoshida | 375/39 |

FOREIGN PATENT DOCUMENTS 1506352 5/1978 United Kingdom ................. 375/84

Primary Examiner—Benedict V. Safourek
Assistant Examiner—Stephen Chin
Attorney, Agent, or Firm—Kirschstein, Kirschstein, Ottinger & Cobrin

[57] ABSTRACT

In a receiver arrangement for a quadrature phase-shift digital data transmission system including an adaptive equalizing regenerator, a phase control signal for the local oscillator is derived from an output of the regenerator and decision feedback signals within the regenerator are applied by way of balanced current switching circuits.

11 Claims, 5 Drawing Figures

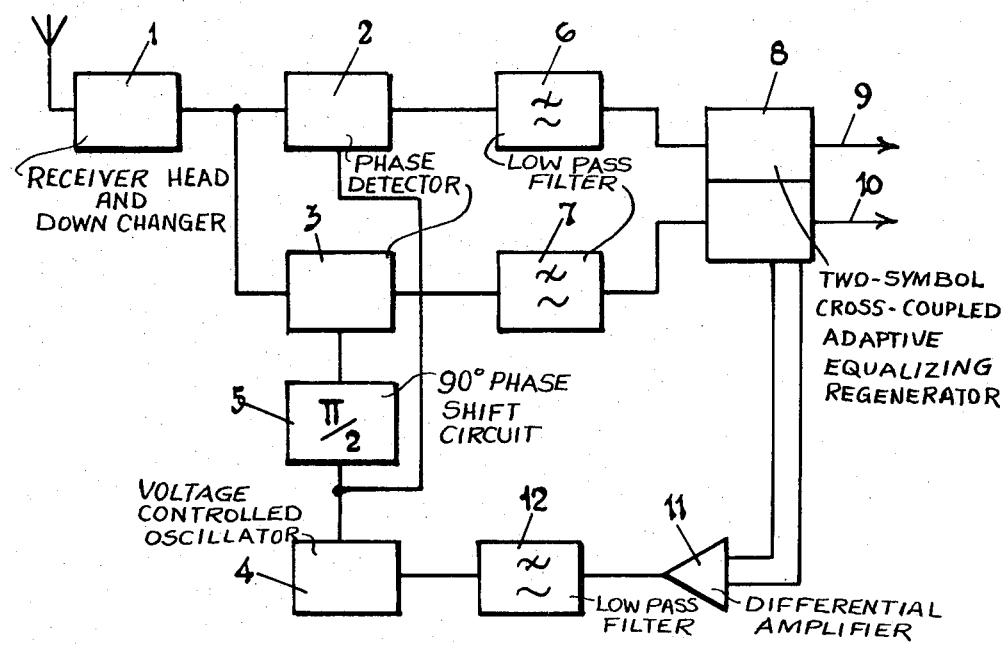
FIG.1.
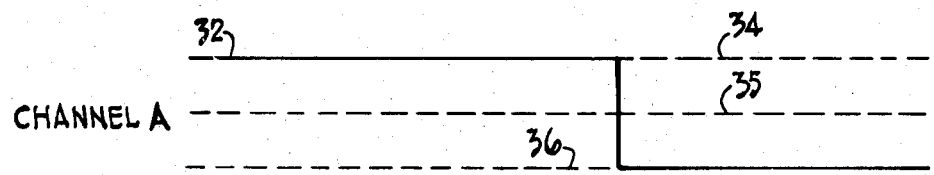
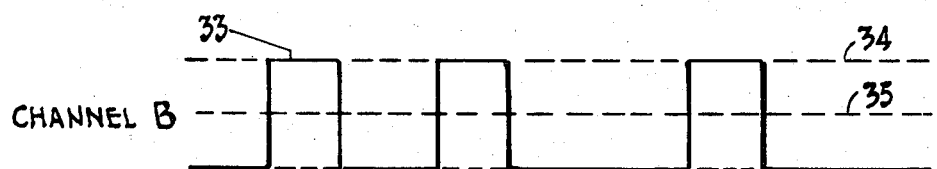
FIG.4.
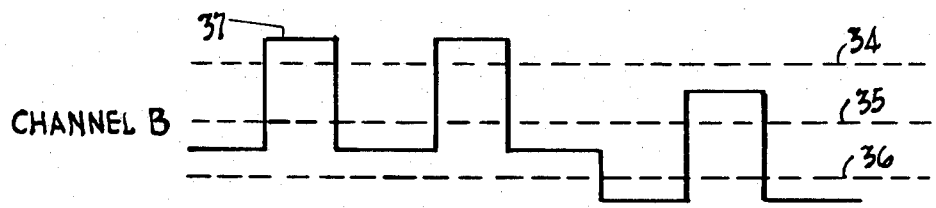
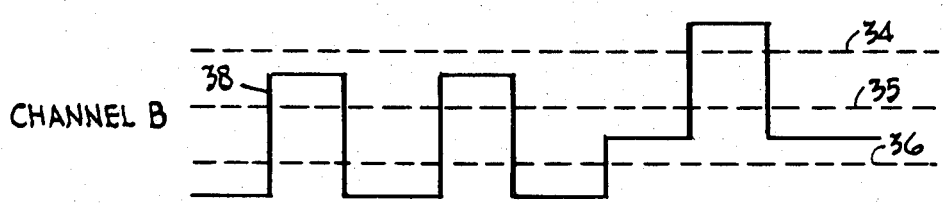

DIGITAL DATA TRANSMISSION SYSTEMS

The present invention relates to digital data transmission systems.

In particular the invention relates to receiver arrangements for quadrature phase shift transmission systems. The process of phase demodulation requires that a reference oscillation at the carrier frequency be generated in the correct phase relationship with respect to the phases representing the four possible signal states. This process has in the past been performed using a frequency multiplier type phase-locked loop extraction circuit. However, in more recent work aimed at reducing the bandwidth of the channel filters in order to increase spectrum efficiency the frequency multiplier technique has been found unsatisfactory.

According to one aspect of the present invention in a receiver arrangement for a quadrature phase shift digital data transmission system comprising quadrature phase detectors, a local oscillator, and an adaptive equalising regenerator for regenerating digital data signals detected by said phase detectors, there are provided means responsive to elements of cross-talk in said digital data signals to derive a phase control signal for said local oscillator.

Preferably said regenerator includes in respect of each phase detector a plurality of threshold detectors connected to receive digital data signals from the respective phase detector, and said phase control signal is arranged to be derived in dependence upon the outputs of some at least of the threshold detectors associated with each of said phase detectors.

According to another aspect of the present invention in a receiver arrangement for a quadrature phase shift digital data transmission system, an adaptive equalising regenerator for regenerating digital data signals detected by quadrature phase detectors of the receiver comprises, in respect of each phase detector, a plurality of threshold detectors and means selectively to add current or voltage increments to output signals from the respective phase detector before said output signals are applied to said threshold detectors in dependence upon the value or values of one or more preceding digits.

Preferably triangular waveforms are superimposed on reference voltages provided for some at least of said threshold detectors, said triangular waveforms enabling the adjustment of the mean levels of said threshold voltages and of the values of the current or voltage increments added to said output signals from the phase detectors.

A receiver arrangement for a digital data transmission system, the arrangement being in accordance with the present invention, will now be described by way of example with reference to the accompanying drawings, of which:

FIG. 1 shows part of the receiver arrangement schematically,

FIG. 4 shows voltage waveforms illustrating the operation of part of the receiver arrangement.

Figure 2:
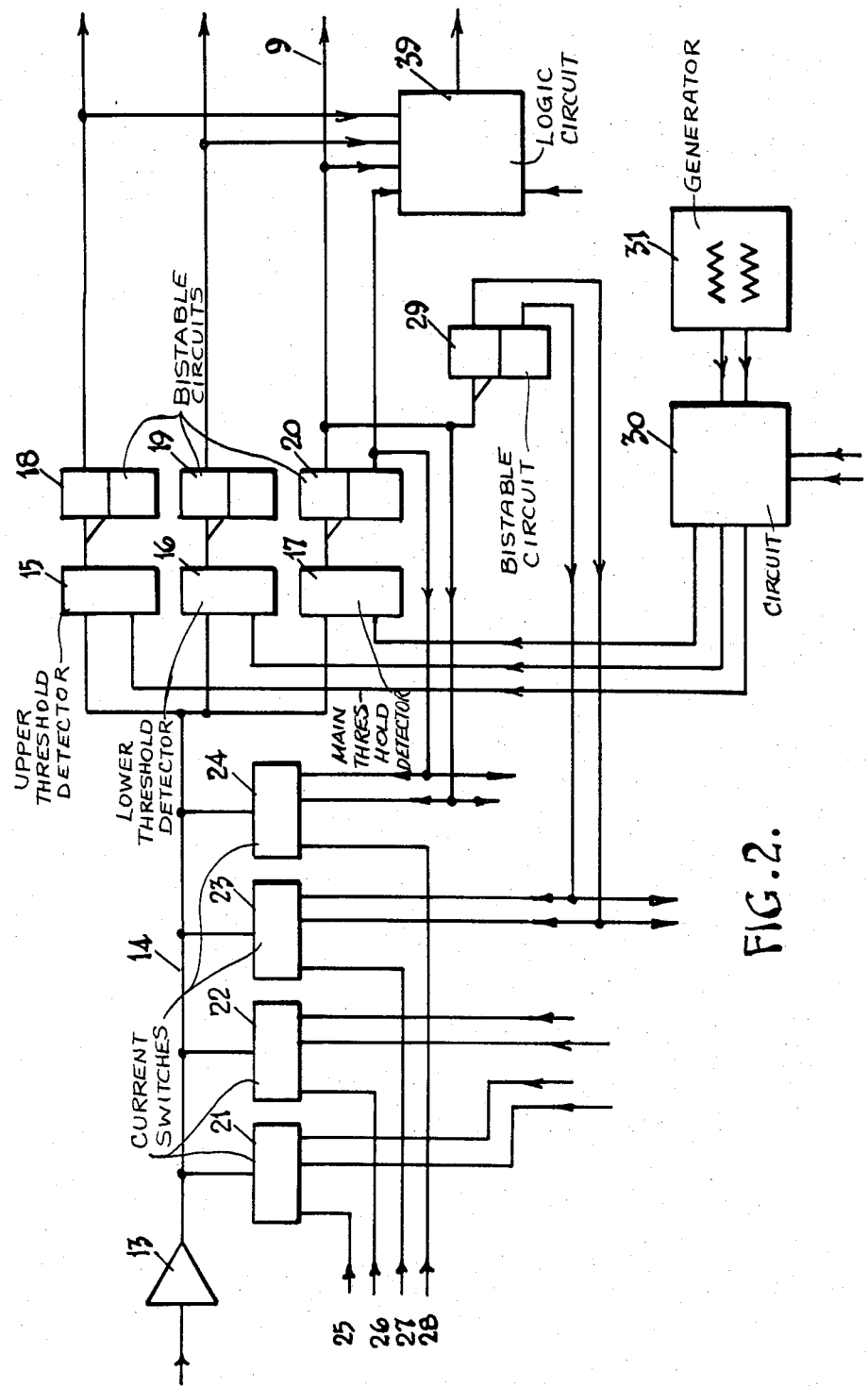
FIGS. 2, 3 and 5 show parts of the receiver arrangement in greater detail.

Referring first to FIG. 1, the receiver arrangement comprises a receiver head and down changer 1 which is arranged to receive phase-shift modulated radio frequency signals and to apply corresponding intermediate frequency signals to a pair of phase detectors 2 and 3. Local oscillator signals at the intermediate frequency are applied in quadrature to the two detectors from a voltage-controlled oscillator 4, there being for example a ninety degree phase shift circuit 5 in the path from the oscillator 4 to the detector 3.

Output signals from the phase detectors 2 and 3 are applied by way of respective low-pass filters 6 and 7 to a two-symbol cross-coupled adaptive equalising regnerator 8, which provides two streams of regenerated digits on paths 9 and 10 and a phase control voltage for the oscillator 4 by way of a differential amplifier 11 and a low-pass filter 12.

Referring now to FIG. 2, which shows effectively half of the regenerator 8, signals from, say, the phase detector 2 are applied by way of the filter 6 and a buffer amplifier 13 to a transmission path 14, which is connected in common to respective inputs of an upper threshold detector 15, a lower threshold detector 16 and a main threshold detector 17. The signals on the path 14 are not in general of ideal rectangular waveform, and the output decisions of the threshold detectors 15, 16 and 17 are entered into respective bistable circuits 18, 19 and 20 at approximately the midpoints of the received data digit periods under the control of timing signals or clock signals derived from, say, transitions in the signals on the path 14. An output from the bistable circuit 20 is passed to the path 9, while an output from a corresponding bistable circuit (not shown) in the other half of the regenerator 8 is passed to the path 10 (FIG. 1).

Connected to the transmission path 14 are four current switches 21 to 24 which are arranged to apply to the line 14 currents of respective values dependent upon weighting signals applied to the switches 21 to 24 over paths 25 to 28. The current values are also dependent respectively on outputs from the bistable circuit 20, a further bistable circuit 29 and outputs from corresponding bistable circuits (not shown) in the other half of the regenerator 8. The bistable circuits 20 and 29 effectively store the values of the two digits preceding that present on the path 14 at any given time.

Reference voltages for the threshold detectors 15, 16 and 17 are set up in a circuit 30, those for the detectors 15 and 16 having superimposed on them anti-phase triangular waveforms from a generator 31. These triangular waveforms enable logic circuits (not shown) receiving signals from the threshold circuits 15, 16 and 17, and the corresponding circuits in the other half (not shown) of the regenerator 8, to adapt the mean values of the reference or threshold voltages set up in the circuit 30 to suit the amplitudes of the signals on the path 14, and also to adapt the values of the weighting signals applied to the current switches 21 to 24. In this way the signal levels on the path 14 and the threshold voltages are arranged to vary so that the received data digits are equalised and regenerated accurately.

Figure 3:
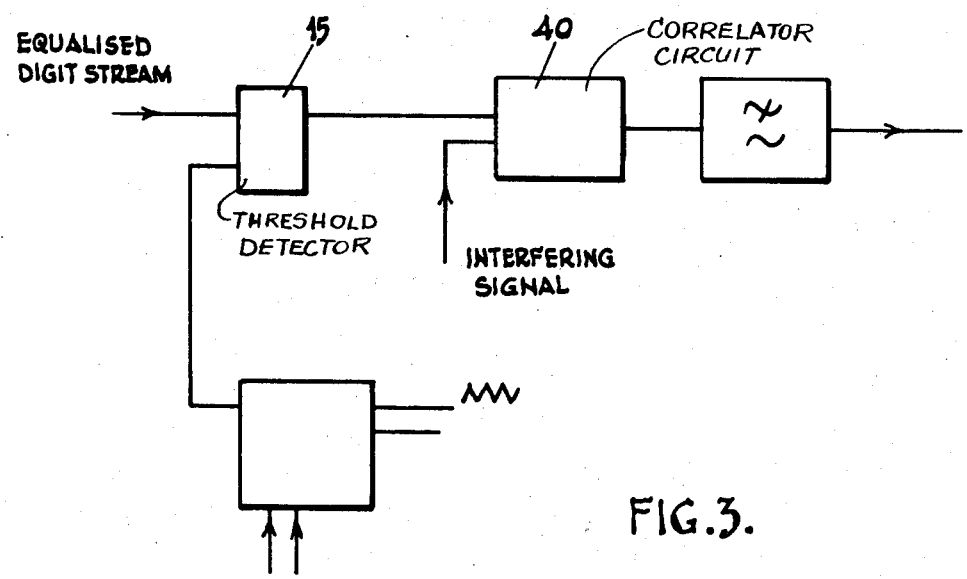

Referring to FIG. 3, to derive a measure of a particular contribution to the inter-symbol degradation of each data digit stream, correlations are made between the appropriate delayed digit signal sequences and the degraded signals. In this way the various interference contributions may be separately determined. Positive and negative interferences produce corresponding effects on the digital sequence at the output of say, the detector 15, and the output of this detector is correlated digitally in a circuit 40 with each of the interfering sequences, (for example, with the main signal delayed by one symbol period, from the output of the bistable circuit 20, in which case intersymbol interference from the previous bit is measured). The output of the correlator 40 is converted into a constant amplitude bipolar signal and used via a low-pass filter (not shown) and a high-gain amplifier (not shown) as the weighting signal for a respective one of the switches 21 to 24. The triangular waveform sweep voltage superimposed on the upper and lower decision reference voltages enables, say, the mean levels of the respective bipolar signals to be made proportional to the departure of the degraded signals from the respective threshold voltages, at least over a range of levels determined by the amplitude of the triangular waveform.

Referring now to FIG. 4, when the phase of the local oscillator signals is substantially correct the two data streams are correctly equalised as shown in waveforms 32 and 33, where the dashed lines 34, 35 and 36 represent respectively the upper, main and lower threshold voltages. If the local oscillator phase is incorrect in either sense there is a degree of cross-talk between the data streams such that the waveform 33 say becomes distorted in one or other sense as shown by waveforms 37 and 38.

To derive a phase correcting voltage from these waveforms a logic function L is developed by means of a logic circuit arrangement 39 such that $$L = (U_B \cdot M_B + L_B \cdot \overline{M}_B) \oplus M_A$$

where the terms $M_A$, $M_B$, $U_B$ and $L_B$ have the value "1" when the signal values applied to the respective threshold circuits are above the respective main thresholds of the A and B channels and the upper and lower thresholds of the B channel respectively, and the operators ".", "+" and "⊕" are logic "AND", "OR" and "Exclusive OR" respectively.

By inspection it will be seen that the function L has the value "0" continuously for the waveform 37 and the value "1" continuously for the waveform 38.

For lesser phase errors than those represented by the waveforms 37 and 38 the triangular waveforms superimposed on the threshold voltages 34 and 36 have the effect of producing alternating values for L such that the mean value of this function varies progressively between the two extremes over a range of phase errors centred on the correct phase.

Corresponding logic functions L developed in the two halves of the regenerator 8 are applied to the differential amplifier 11 to derive the phase control voltage for the local oscillator 4.

Figure 5:
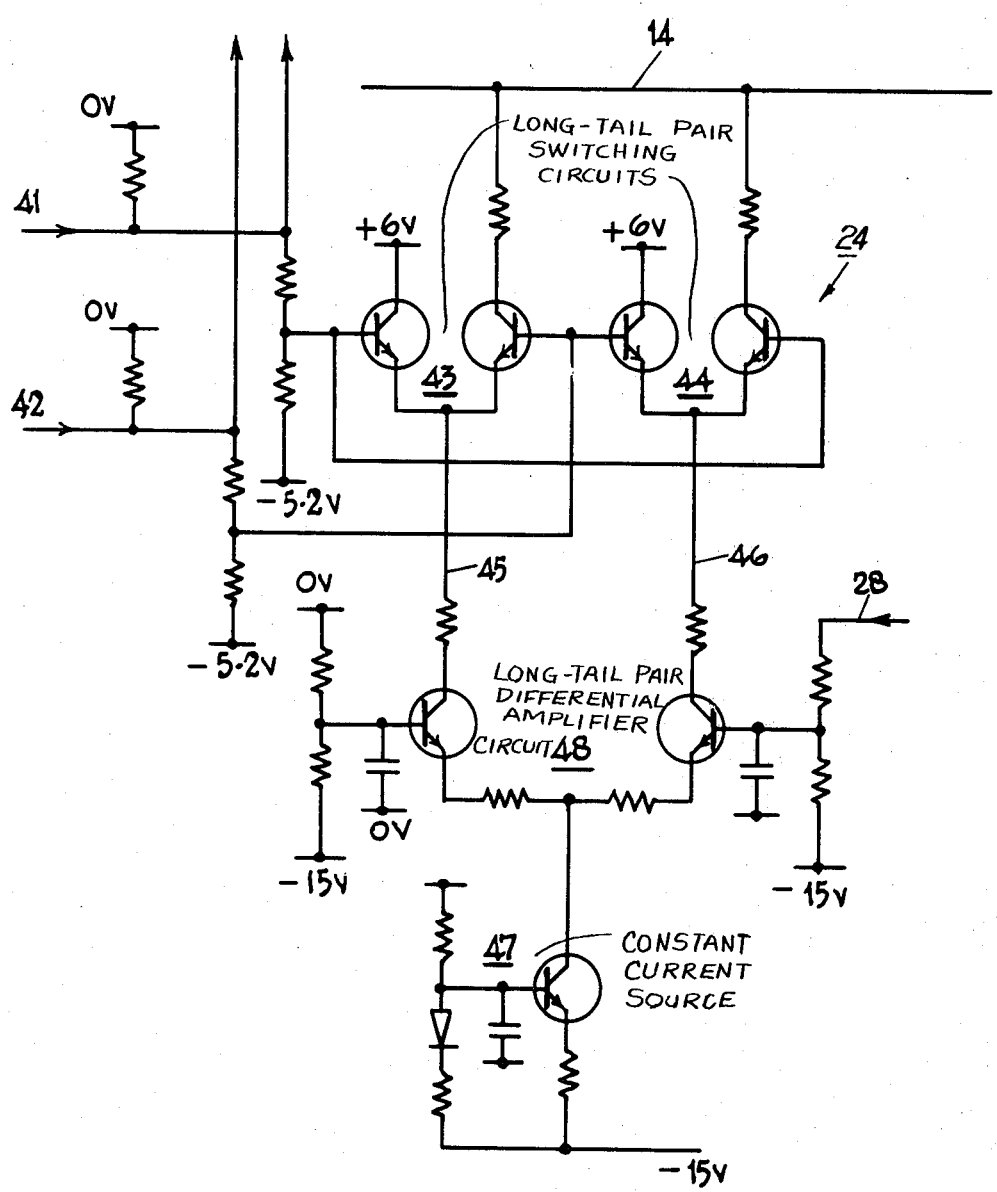

Referring now to FIG. 5, which shows in detail one of the current switches 21 to 24, for example the switch 24, signals representing the value of the digit last received and its inverse are applied from the bistable circuit 20 (FIG. 2) to inputs 41 and 42. By means of these digit value signals one or other of two long-tail pair switching circuits 43 and 44 is arranged to connect a respective path 45 or 46 to the path 14, in dependence upon whether the last received digit was a one or a zero, the other path 45 or 46 then being connected to a 6 volt supply line.

A substantially constant current from a source 47 is split between the two paths 45 and 46 by a long-tail pair differential amplifier circuit 48 in dependence upon the value of the weighting signal applied over the path 28.

By means of this circuit a current can be effectively added or subtracted from the incoming signal on the path 14 in dependence upon whether the last received digit was a one or a zero, the current having any negative or positive value over a range of values in dependence upon the weighting signal on the path 28. Thus, denoting the currents in the paths 45 and 46 as $I_1$ and $I_2$ respectively and the constant current from the source 47 as $I_o$:

$$I_1 + I_2 = I_o$$

Writing:

$$I_1 = \tfrac{1}{2}(I_1 + I_2) + \tfrac{1}{2}(I_1 - I_2)$$

it can be seen that:

$$I_1 = \tfrac{1}{2}I_o + \tfrac{1}{2}(I_1 - I_2)$$

Similarly:
$$I_2 = \tfrac{1}{2}I_o - \tfrac{1}{2}(I_1 - I_2)$$

Thus there is a constant standing current of $\tfrac{1}{2}I_o$ flowing in the path 14 by way of the switching circuits 43 and 44 with $\tfrac{1}{2}(I_1 - I_2)$ being added to this standing current when the signal at input 41 is a zero and being subtracted from this standing current when the signal at input 41 is a one. It can be seen that the current difference $(I_1 - I_2)$ will be dependent upon the weighting signal on the input path 28.

The transistors used in the circuit arrangement shown in FIG. 5 are all N-P-N transistors, resulting in fast switching and ease of integration.

We claim:
1. A receiver arrangement for a quadrature phase-shift digital data transmission system comprising:
    (A) two quadrature phase detectors,
    (B) a local oscillation generator,
    (C) means to apply signals from said generator to each of said phase detectors to derive from a phase-shift modulated received signal respective phase detector output signals varying substantially between at least two discrete values in dependence upon data digit values being transmitted over the system,
    (D) at least two main threshold detectors arranged respectively to compare said respective phase detector output signals with a main threshold value intermediate two said discrete values during each of a succession of received data digit periods to provide first binary output signals having values dependent upon the results of said main threshold comparisons,
    (E) at least one auxiliary threshold detector arranged to compare one of said phase detector output signals with an auxiliary threshold value of substantially one of said two discrete values during said received data digit periods to provide second binary output signals having values dependent upon said auxiliary threshold comparison, and
    (F) logic circuit means to derive from said first and second binary output signals at least one analogue control signal for said receiver arrangement.

2. A receiver arrangement in accordance with claim 1 wherein said analogue control voltage controls the value of said auxiliary threshold.

3. A receiver arrangement in accordance with claim 1 wherein there are provided two auxiliary threshold detectors arranged to compare one of said phase detector output signals with respective auxiliary thresholds having values substantially at said discrete values, the value of the main threshold in respect of that phase detector output signal being set in dependence upon the values of said auxiliary thresholds.

4. A receiver arrangement in accordance with claim 3 wherein analogue control voltages to control the value of said two auxiliary thresholds are arranged to be derived by said logic circuit means from the binary output signals from said main threshold detector and said two auxiliary threshold detectors.

5. A receiver arrangement in accordance with claim 1 wherein said analogue control voltage provides a measure of any intersymbol interference between the output signals of said phase detectors, and there are provided means to control the phase of signals generated by said local oscillation generator in such a sense as to minimize said intersymbol interference.

6. A receiver arrangement in accordance with claim 1 including decision feedback means selectively to combine with the output signals from one at least of said phase detectors a weighting signal, during a received data digit period, in dependence upon the value of at least one of the binary output signals from a main threshold detector during a preceding data digit period, the value of said weighting signal being determined by an analogue control signal derived by said logic circuit means.

7. A receiver arrangement in accordance with claim 6 wherein the means selectively to combine said weighting signal with the output signal of said one of the phase detectors comprises a constant current source, means to divide the current from said source between two paths in proportions dependent upon the value of the weighting signal, and switching means to connect one or other of said paths to the output of said phase detector.

8. A receiver arrangement in accordance with claim 1 wherein a triangular-waveform voltage is superimposed on said auxiliary threshold value to extend the range of proportionality of said analogue control voltage.

9. A receiver arrangement for a quadrature phase-shift digital data transmission system comprising:
 (A) two quadrature phase detectors,
 (B) a local oscillation generator,
 (C) means to apply signals from said generator to each of said phase detectors to derive from a phase-shift modulated received signal respective phase detector output signals varying substantially between at least two discrete values in dependence upon data digit values being transmitted over the system,
 (D) at least two main threshold detectors arranged respectively to compare said respective phase detector output signals with a main threshold value intermediate two said discrete values during each of a succession of received data digit periods to provide respective first binary output signals having values dependent upon the results of said main threshold comparisons,
 (E) at least two auxiliary threshold detectors arranged respectively to compare said respective phase detector output signals with an auxiliary threshold value of substantially one of said two discrete values during said received data digit periods to provide respective second binary output signals having values dependent upon said auxiliary threshold comparisons,
 (F) decision feedback means selectively to combine with the output signals from one at least of said phase detectors a weighting signal, during a received data digit period, in dependence upon the value of at least one of the first binary output signals during a preceding data digit period,
 (G) logic circuit means to derive from said first and second binary signals at least one analogue voltage signal dependent upon any intersymbol interference in said binary signals, and
 (H) means to apply said analogue voltage as a control voltage in such a sense as to minimize said intersymbol interference.

10. A receiver arrangement in accordance with claim 9 wherein one said analogue voltage signal is applied to control the phase of signals generated by said local oscillation generator.

11. A receiver arrangement in accordance with claim 9 wherein at least one said analogue voltage signal is applied to control the value of said weighting signal.

* * * * *